United States Patent
Koreis

(12) 
(10) Patent No.: US 6,489,745 B1
(45) Date of Patent: Dec. 3, 2002

(54) CONTACTLESS POWER SUPPLY

(75) Inventor: Rocke R. Koreis, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/952,424

(22) Filed: Sep. 13, 2001

(51) Int. Cl.⁷ .................................................. H02J 7/00
(52) U.S. Cl. ...................................................... 320/108
(58) Field of Search ........................... 320/108; 307/150

(56) References Cited

U.S. PATENT DOCUMENTS

| | | | | |
|---|---|---|---|---|
| 5,644,207 A | * | 7/1997 | Lew et al. ..................... | 307/43 |
| 5,734,254 A | * | 3/1998 | Stephens ..................... | 320/106 |
| 5,959,433 A | * | 9/1999 | Rohde ......................... | 320/108 |
| 6,040,680 A | * | 3/2000 | Toya et al. .................. | 320/108 |
| 6,233,343 B1 | * | 5/2001 | Muranami et al. .......... | 361/679 |
| 6,316,909 B1 | * | 11/2001 | Honda et al. ............... | 320/108 |
| 6,331,744 B1 | * | 12/2001 | Chen et al. ................. | 310/171 |

* cited by examiner

*Primary Examiner*—Gregory J. Toatley, Jr.
(74) *Attorney, Agent, or Firm*—Harness, Dickey & Pierce, P.L.C.

(57) ABSTRACT

A contactless power supply and system is provided that comprises an inductive coil disposed within a seatback tray of a mobile platform, e.g. a commercial aircraft, and a receptor disposed within a computing device, wherein the computing device is placed on the seatback tray and the inductive coil is energized, thereby providing electrical current to power the computing device. The contactless power supply further comprises a shielding member that is installed in the computing device to protect components of the personal computer from any detrimental effects of magnetic fields produced by the inductive coil.

50 Claims, 3 Drawing Sheets

CONTACTLESS POWER SUPPLY

FIELD OF THE INVENTION

The present invention relates generally to power supplies and more particularly to contactless, or wireless, power supplies.

BACKGROUND OF THE INVENTION

Wireless communications are continuously being developed for numerous applications in the field of computing. For example, laptop computers are capable of communicating with remote servers through radio frequency (RF) transmission to access services such as the Internet or e-mail. Additionally, personal digital assistants (PDAs) are similarly capable of accessing remote services through RF transmission. Accordingly, physical wires or cords are not required with wireless communications, which results in significant advantages in terms of portability and minimal equipment required for continuous computing operations.

Although wireless applications in the field of computing are continually expanding, a wireless solution to the traditional power supply or "brick" has not yet been developed. If a user is operating a laptop computer wirelessly from a remote location that does not have an adaptable power supply, i.e. 110V AC power outlet, the operating time of the laptop computer is limited to the available charge provided by at least one rechargeable battery, which is typically provided within the laptop computer. As a result, the amount of time that the laptop computer remains operational is limited by the life of the rechargeable battery when access to power via a power cord or "brick" is unavailable.

One device that provides wireless power transfer is disclosed in U.S. Pat. No. 6,278,210 to Fatula, Jr. et al., wherein power is supplied to a rotary element by magnetic induction. Generally, a magnetic flux is introduced in an induction assembly, which causes an alternating current that is converted to a direct current, which is further stored in an electrical storage device without the use of wires. Unfortunately, the device of Fatula requires moving parts and is relatively large for use in portable devices such as laptop computers.

Accordingly, there remains a need in the art for a contactless power supply for use with computing devices such as laptop computers and PDAs. A need further exists for a contactless power supply that also provides battery charging capability for computing devices, furthermore onboard a mobile platform, e.g. a commercial airline, such that operating time of the computing device is not limited to the available charge of rechargeable batteries.

SUMMARY OF THE INVENTION

In one preferred form, the present invention provides a contactless power supply for use with a computing device disposed proximate a charging unit that comprises an inductive coil disposed within the charging unit and a receptor disposed within the computing device. Accordingly, the inductive coil provides electrical current, through its generation of a magnetic field, to the receptor to power the computing device and to further charge any rechargeable batteries of the computing device.

Preferably, the contactless power supply is employed on a mobile platform, e.g. a commercial aircraft, wherein the inductive coil is disposed in a seatback tray and a user simply places a computing device such as a laptop computer on the seatback tray in order to provide power for continuous operation. Additionally, the power supply may further provide battery charging capability to the computing device.

The contactless power supply may further comprise a shielding member disposed within the computing device in order to protect elements of the computing device from any detrimental effects of magnetic fields produced by the inductive coil. For example, the hard drive and any disk drives are preferably shielded to prevent contents therein from being inadvertently erased by the magnetic fields. Additional components of the computing device such as the internal clock, among others, may also be shielded as required, depending on the strength of the inductive coil.

The computing device according to the present invention may be a personal computer, a laptop computer, or a personal digital assistant (PDA), among others. Accordingly, an airline passenger or crewmember simply places the computing device on the seatback tray in order to have continuous power throughout the duration of the flight.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the preferred embodiments is merely exemplary in nature and is in no way intended to limit the invention, its application, or uses.

Figure 1:
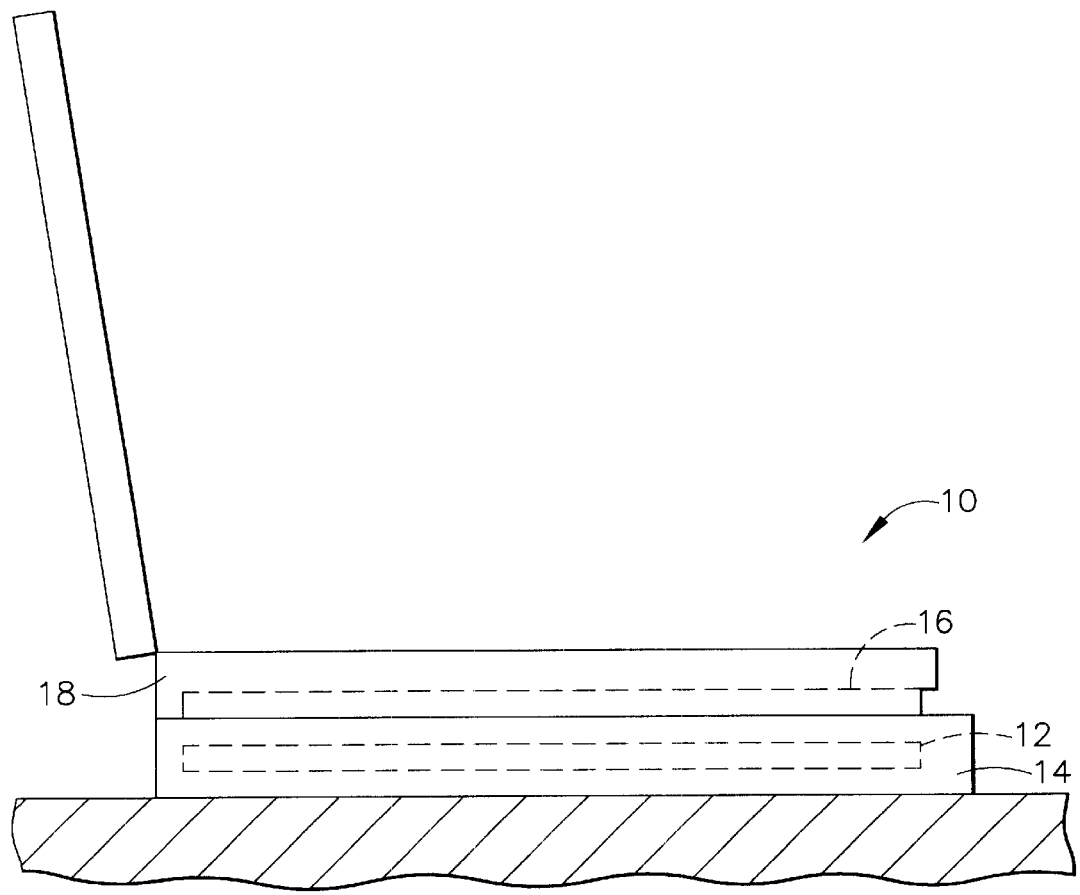
FIG. 1 is a side view of a contactless power supply in accordance with the present invention.

Referring to the drawings, a contactless power supply according to the present invention is illustrated and generally indicated by reference numeral 10 in FIG. 1. The contactless power supply comprises an inductive coil 12 disposed within a charging unit 14, along with a receptor 16 disposed within or on a computing device 18, wherein the computing device 18 is positioned proximate the charging unit 14 as shown. When energized, the inductive coil 12 generates magnetic fields to provide electrical current to the receptor 16, which powers the computing device 18. Further, the electrical current may also be used to charge batteries (not shown) of the computing device 18 in addition to supplying power. Accordingly, the computing device 18 is powered without the use of conventional wires, power cords, or power supply "bricks."

More specifically, the contactless power supply 10 comprises a two-part transformer, wherein the transformer has a flat configuration so as to fit within, for example, a seatback tray or a desktop. The first part of the transformer is located within the seatback tray and is coupled to a source of AC power. The second part of the transformer, hereinafter referred to as receiving coil and core, is located within the computing device 18 and is coupled to a rectifier that converts AC power to DC power. When magnetic field lines are approximately 90 degrees to the first part of the transformer when the receiving coil and core are placed within the field, current is induced into the computing device 18. Further, a pair of diodes in the receiving coil and core produce direct current for the computing device 18.

Preferably, the receptor 16 is a thin flat coil disposed on or within the computing device 18, which is further sized and positioned according to power requirements of specific applications. In one form, the receptor 16 is disposed on a bottom surface of the computing device 18. Additionally, the inductive coil 12 is similarly positioned within the charging unit 14 and sized according to specific power requirements. Furthermore, the computing device 18 may be a personal computer, a laptop computer, or a personal digital assistant (PDA), among other computing devices commonly known in the art.

Figure 2:
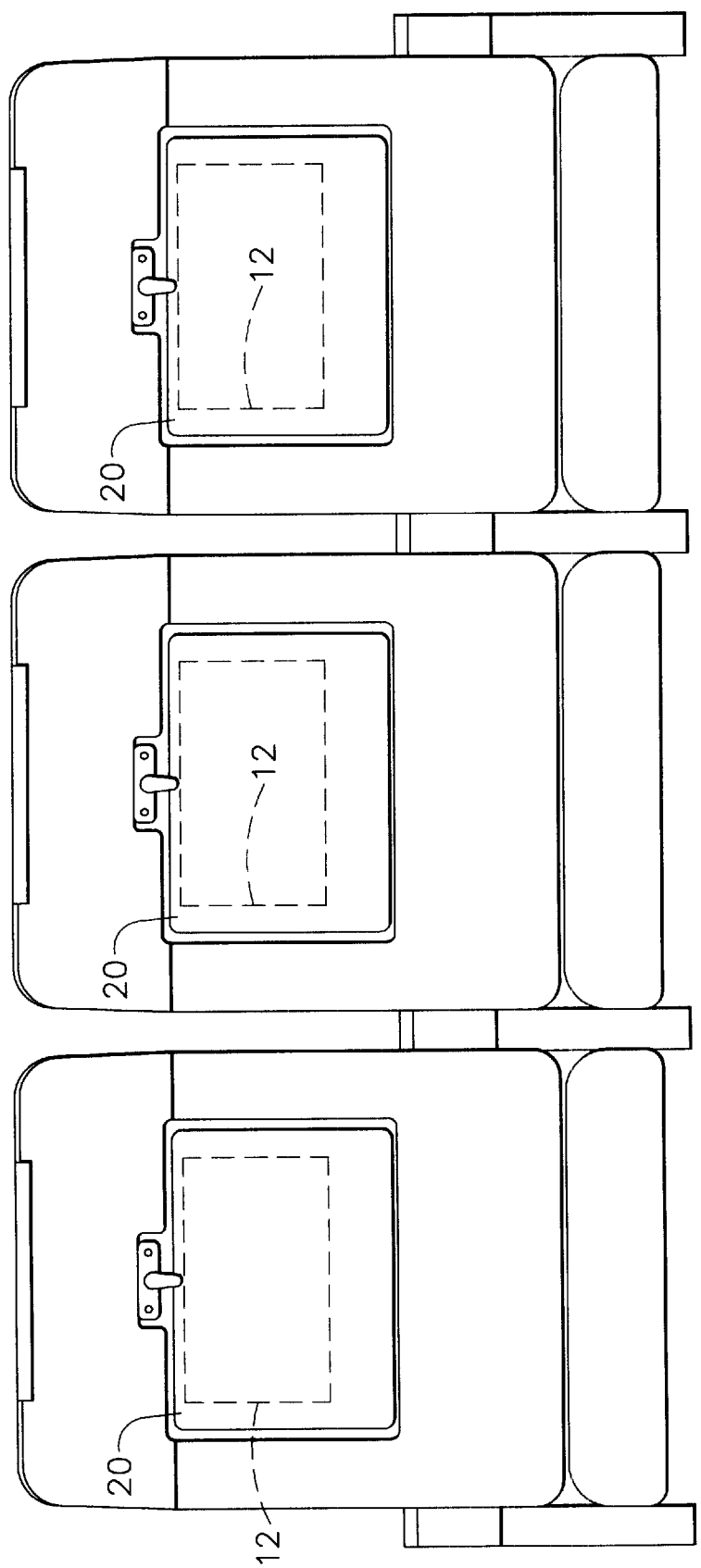
FIG. 2 is a front view of a plurality of seatback trays onboard a mobile platform with inductive coils disposed therein in accordance with the present invention.
Figure 3:
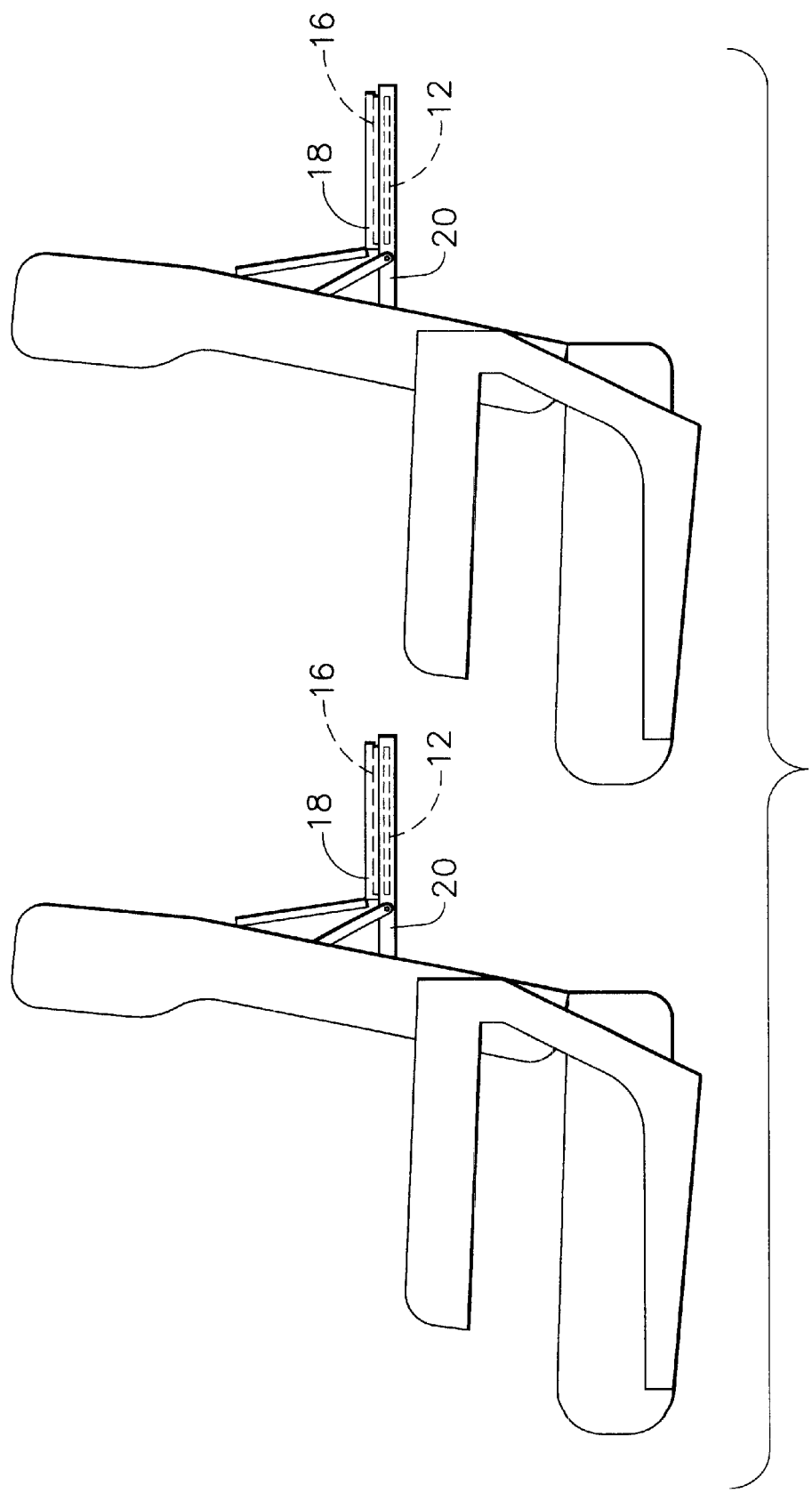
FIG. 3 is a side view on an extended seatback tray having an inductive coil disposed therein and a computing device having a receptor in accordance with the present invention.

Referring to FIGS. 2 and 3, the preferred embodiment of the present invention provides the contactless power supply 10 for use onboard a mobile platform, e.g. a commercial aircraft. Accordingly, the inductive coil 12 is disposed within a seatback tray 20, and a passenger simply places the computing device 18, illustrated herein as a laptop computer, on the seatback tray 20 to power the computing device 18 as previously set forth. As a result, the computing device 18 may be operated throughout the duration of the flight and is not limited by the available charge of the batteries disposed therein. Further, the contactless power supply 10 may also be configured to recharge batteries of the computing device 10 while simultaneously providing power.

Although the detailed description herein is directed to a contactless power supply wherein the mobile platform is an aircraft, the invention is also applicable to other modes of mass transit such as ship, train, bus, and others. Accordingly, the reference to aircraft should not be construed as limiting the scope of the present invention.

In another form, the contactless power supply 10 further comprises a shielding member (not shown) that protects elements of the computing device 18 from detrimental effects of magnetic fields produced by the inductive coil 12. More specifically, the hard drive and any disk drives within the computing device 18 are preferably shielded to prevent contents therein from being inadvertently erased by the magnetic fields. Additional components of the computing device 18 such as the internal clock, among others, may also be shielded as required, depending on the strength of the inductive coil 12.

In yet another form, the present invention provides a method of wirelessly providing power to the computing device 18 onboard a mobile platform, wherein a computing device 18 is placed on the seatback tray 20 and the inductive coil 12 is energized in order to provide electrical current to the receptor 16 disposed within or on the computing device 18. Once the inductive coil 12 is energized, power is provided to the computing device 18 for the duration of the flight.

Preferably, a switch (not shown) is installed on the seatback tray 20 so that a user can energize the contactless power supply 10 as required. Further, the contactless power supply 10 also comprises a disabling switch (not shown), which may be a mechanical switch or other switching methods commonly known in the art such as optical, that turns off the contactless power supply 10 when the seatback tray 20 is returned to its stowed position. Moreover, the seatback tray 20 is in communication with aircraft systems such that the contactless power supply 10 may be disabled under specific circumstances such as takeoff, landing, or emergency situations.

Accordingly, a contactless power supply is provided that eliminates the use of traditional hard wires, cables, or power supply "bricks" that are typically used with computing devices such as personal computers and laptop computers. As a result, a user is capable of extending the operating time of a computing device, further without the need for additional equipment and physical wiring.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A contactless power supply for use with a computing device comprising:

a charging unit comprising a stowable work surface capable of having a stowed position and a retracted position sized to support the computing device, and an inductive coil disposed within the charging unit; and a receptor disposed within the computing device, the computing device positioned proximate the charging unit, wherein the inductive coil provides electrical current to the receptor to power the computing device.

2. The contactless power supply of claim 1 further comprising a shielding member disposed within the computing device to protect elements of the computing device from detrimental effects of magnetic fields produced by the inductive coil.

3. The contactless power supply of claim 1, wherein the receptor is a thin flat coil.

4. The contactless power supply of claim 1, wherein the charging unit is a seatback tray.

5. The contactless power supply of claim 1, wherein the computing device is a personal computer.

6. The contactless power supply of claim 1, wherein the computing device is a laptop computer.

7. The contactless power supply of claim 1, wherein the receptor is disposed on a bottom surface of the computing device.

8. The contactless power supply of claim 1, wherein the computing device is a personal digital assistant.

9. A contactless power supply for use onboard a mobile platform comprising:

an inductive coil disposed within a seatback tray;

a receptor disposed within a computing device, the computing device positioned proximate the seatback tray, wherein the inductive coil provides electrical current to the receptor to power the computing device.

10. The contactless power supply of claim 9 further comprising a shielding member disposed within the computing device to protect elements of the computing device from detrimental effects of magnetic fields produced by the inductive coil.

11. The contactless power supply of claim 9, wherein the receptor is a thin flat coil.

12. The contactless power supply of claim 9, wherein the seatback tray further comprises a switch that is activated by a user to energize the contactless power supply as required.

13. A contactless power supply for use onboard a mobile platform, the contactless power supply comprising:

an inductive coil disposed within a seatback tray, the seatback tray comprising a disabling switch that automatically turns off the contactless power supply when the seatback tray is returned to a stowed position; and a receptor disposed within a computing device, the computing device positioned proximate the seatback tray, wherein the inductive coil provides electrical current to the receptor to power the computing device.

14. The contactless power supply of claim 9, wherein the computing device is a personal computer.

15. The contactless power supply of claim 9, wherein the computing device is a laptop computer.

16. The contactless power supply of claim 9, wherein the receptor is disposed on a bottom surface of the computing device.

17. The contactless power supply of claim 9, wherein the computing device is a personal digital assistant.

18. A system for wirelessly providing power to a computing device onboard a mobile platform comprising:

an inductive coil disposed within a seatback tray, wherein the inductive coil provides electrical current to a receptor disposed on the computing device.

19. The system of claim 18 further comprising a shielding member disposed within the computing device to protect elements of the computing device from detrimental effects of magnetic fields produced by the inductive coil.

20. A method of wirelessly providing power to a computing device onboard a mobile platform, the method comprising the steps of:

(a) placing a computing device on a seatback tray, wherein an inductive coil is disposed within the seatback tray and a thin flat coil is disposed on the computing device; and (b) energizing the inductive coil to transfer electrical current to the thin flat coil, thereby providing power to the computing device.

21. The contactless power supply of claim 1, wherein the charging unit comprises at least a portion of a desktop.

22. The contactless power supply of claim 1, wherein:

the contactless power supply is disposed onboard a mobile platform; and the contactless power supply is configured for communication with at least one control system coupled to the mobile platform such that the contactless power supply is selectively enabled or disabled under one or more predetermined circumstances.

23. The contactless power supply of claim 1, wherein the inductive coil provides electrical current to the receptor to recharge at least one battery of the computing device.

24. The contactless power supply of claim 1, wherein the charging unit is coupled to the stowable work surface such that the contactless power supply is disabled when the stowable work surface is in the stowed position.

25. The contactless power supply of claim 9, wherein the inductive coil provides electrical current to the receptor to recharge at least one battery of the computing device.

26. The contactless power supply of claim 9, wherein the seatback tray is configured for communication with at least one control system coupled to the mobile platform such that the contactless power supply is selectively enabled or disabled under one or more predetermined circumstances.

27. A seatback tray for providing electrical current to a receptor disposed on a computing device onboard a mobile platform, the seatback tray comprising:

a coil disposed within the seatback tray, the coil being configured to provide electrical current to a receptor disposed on a computing device, the seatback tray being configured for communication with at least one control system of the mobile platform such that the inductive coil is selectively enabled or disabled under one or more predetermined circumstances, the seatback tray being operable between a stowed position and an extended position in which the seatback tray forms a work surface for supporting the computer device.

28. The seatback tray of claim 27, further comprising a switch that is activated by a user to energize the coil.

29. The seatback tray of claim 27, further comprising a switch for disabling the inductive coil when the seatback is in the stowed position.

30. A contactless power supply for powering a computer device on an aircraft, the power supply incorporated into a seatback tray, to provide power to a computer device supported on the seatback tray.

31. The contactless power supply of claim 30 further comprising a switch for disabling the power supply when the seatback tray is in its stowed position.

32. The contactless power supply of claim 30, wherein the contactless power supply includes a coil in the seatback tray.

33. The contactless power supply of claim 30, wherein the contactless power supply includes a control for disabling the power supply during takeoff of the aircraft.

34. The contactless power supply of claim 30, wherein the contactless power supply includes a control for disabling the power supply during landing of the aircraft.

35. The contactless power supply of claim 30, wherein the contactless power supply includes a control for disabling the power supply in an emergency.

36. A contactless power supply for powering a computer device on an aircraft, the power supply incorporated into a seatback tray operable between a stowed position and an extended position in which the seatback tray forms a work surface for supporting the computer device, and providing power to a computer device on the work surface without electrical contact.

37. The contactless power supply of claim 36 further comprising a switch for disabling the power supply when the seatback tray is in its stowed position.

38. The contactless power supply of claim 36, wherein the contactless power supply includes a coil in the seatback tray.

39. The contactless power supply of claim 36, wherein the contactless power supply includes a control for disabling the power supply during takeoff.

40. The contactless power supply of claim 36, wherein the contactless power supply includes a control for disabling the power supply during landing.

41. The contactless power supply of claim 36, wherein the contactless power supply includes a control for disabling the power supply in an emergency.

42. In an aircraft having a plurality of rows of seats and seatback trays in at least some of the seats, a contactless power supply incorporated into at least some of the seatback trays, for providing electric power to a computer device supported on the seatback trays.

43. A contactless power system for supplying power to a computer device, the system comprising an induction coil incorporated into a seatback tray on an aircraft, and a coil incorporated into the computer for receiving power from the induction coil in the seatback tray when the computer device is supported on the seatback tray.

44. An aircraft comprising a contactless power supply for powering a computer device on the aircraft, the contactless power supply incorporated into a seatback tray, to provide power to a computer device supported on the seatback tray.

45. The aircraft of claim 44 further comprising a switch for disabling the power supply when the seatback tray is in its stowed position.

46. The aircraft of claim 44, wherein the contactless power supply includes a coil in the seatback tray.

47. The aircraft of claim 44, wherein the contactless power supply includes a control for disabling the power supply during takeoff of the aircraft.

48. The aircraft of claim 44, wherein the contactless power supply includes a control for disabling the power supply during landing of the aircraft.

49. The aircraft of claim 44, wherein the contactless power supply includes a control for disabling the power supply in an emergency.

50. An aircraft having a plurality of rows of seats and seatback trays in at least some of the seats, the aircraft comprising a contactless power supply incorporated into at least some of the seatback trays, for providing electric power to a computer device supported on the seatback trays.

* * * * *